(No Model.)
M. J. MYERS.
ELECTRIC BATTERY.
No. 319,923. Patented June 9, 1885.
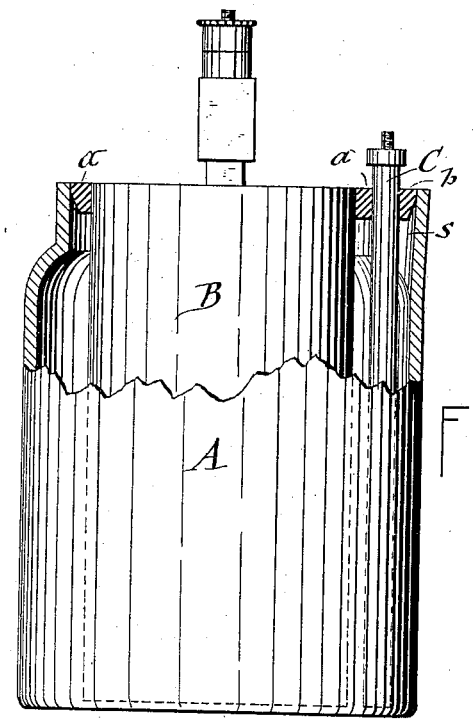
FIG-1-
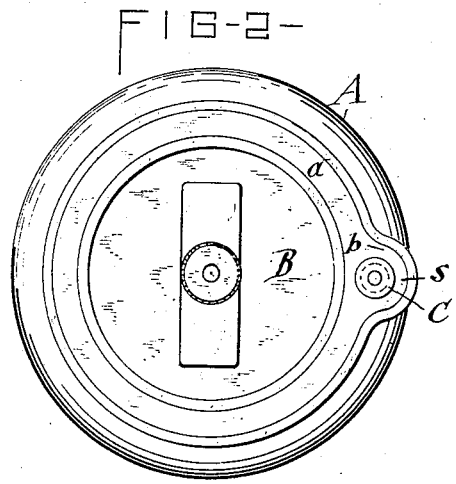
FIG-2-
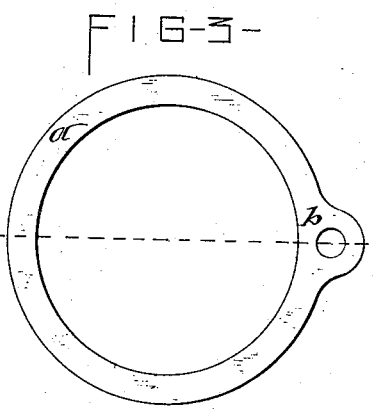
FIG-3-
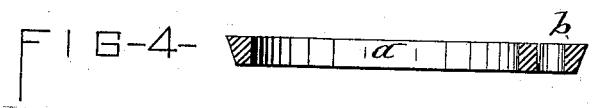
FIG-4-
ATTEST—
Wm. C. Raymond
Lucien S. Crandall
INVENTOR—
M. Jervis Myers

UNITED STATES PATENT OFFICE.

M. JERVIS MYERS, OF SYRACUSE, NEW YORK.

ELECTRIC BATTERY.

SPECIFICATION forming part of Letters Patent No. 319,923, dated June 9, 1885.

Application filed February 6, 1885. (No model.)

*To all whom it may concern:*

Be it known that I, M. JERVIS MYERS, of Syracuse, in the county of Onondaga, in the State of New York, have invented new and useful Improvements in Electric Batteries, of which the following, taken in connection with the accompanying drawings, is a full, clear, and exact description.

This invention is especially designed for that class of batteries which have a porous cell reaching nearly or quite to the top of the jar or outer cell, and the zinc electrode projecting above the top of the latter cell.

The purpose of the invention is to prevent the evaporation of the exciting-liquid of the battery; and to that end my invention consists in the novel construction of an elastic packing-ring embracing the porous cell and zinc electrode, and fitted closely to the interior of the open end and spout of the cell, as hereinafter more fully described, and specifically set forth in the claims.

In the annexed drawings, Figure 1 is a side elevation of a battery provided with my improvement, the upper portion thereof being shown in section to better illustrate the construction and combination of parts. Fig. 2 is a top plan view of the same. Fig. 3 is a detached plan view of the packing-ring, and Fig. 4 is a transverse section of said ring.

Similar letters of reference indicate corresponding parts.

A designates the usual jar or outer cell which contains the exciting-liquid, and the porous cell B and zinc electrode C. The cell A is formed with a spout, $s$, to afford room for the protrusion of the zinc electrode. In connection with this battery I employ an elastic main packing-ring, $a$, and a small supplemental packing-ring, $b$, projecting from the edge of the ring $a$, the whole of which I form of one continuous strip of soft india-rubber, as illustrated in Fig. 3 of the drawings. The large ring $a$ is slipped onto the upper end of the porous cell B, and through the small ring $b$ passes the upper end of the zinc electrode C, said cell and electrode being thus surrounded and closely embraced by the said packing. The perimeter of the combined packing-rings corresponds to that of the interior of the upper end of the cell A, the main ring $a$ fitting into the main portion of the opening of said cell, and the supplemental ring $b$ extending into the spout $s$, as shown in Fig. 2 of the drawings. Said described packing I prefer to form tapering on its outer edge, as shown in Fig. 4 of the drawings, so as to allow it to be effectually wedged between the cell B, electrode C, and cell A, as illustrated in Fig. 1 of the drawings.

I am aware that prior to my present invention caps or covers have been applied to electric batteries, and provided with perforations for the protrusion of the necks of the electrodes; but such devices are not adapted for the style of batteries herein referred to.

Having described my invention, what I claim is—

1. In an electric battery, the combination, with the porous cell, zinc electrode, and their inclosing cell or jar, of an elastic packing-ring completely surrounding the upper end of the porous cell, and an elastic lateral extension of said packing-ring embracing the zinc electrode, as and for the purpose set forth.

2. In combination with the porous cell B, zinc electrode C, and the inclosing-cell A, provided with the spout $s$, the elastic packing-ring $a$, surrounding the upper end of the porous cell, and formed with the supplemental ring $b$ surrounding the zinc electrode, said combined rings being wedged between the cell B, electrode C, and cell A, substantially as described and shown.

In testimony whereof I have hereunto signed my name and affixed my seal, in the presence of two attesting witnesses, at Syracuse, in the county of Onondaga, in the State of New York, this 3d day of February, 1885.

M. JERVIS MYERS. [L. S.]

Witnesses:
FREDERICK H. GIBBS,
C. H. DUELL.